Oct. 1, 1940.   M. A. WEST ET AL   2,216,382
SCREW
Filed Nov. 1, 1939   2 Sheets-Sheet 1

Inventors
Maxwell A. West
George E. West
By T. J. Geisler
and F. R. Geisler
Attorneys Oct. 1, 1940.  M. A. WEST ET AL  2,216,382
SCREW
Filed Nov. 1, 1939   2 Sheets-Sheet 2

Inventors
Maxwell A. West
George E. West
By T. J. Geisler
and T. R. Geisler
Attorneys Patented Oct. 1, 1940

2,216,382

UNITED STATES PATENT OFFICE 2,216,382

SCREW

Maxwell A. West, Portland, and George E. West, Sherwood, Oreg., assignors of forty-nine one-hundredths to W. H. Holmes and Philip C. Smith, both of Portland, Oreg.

Application November 1, 1939, Serial No. 302,352

7 Claims. (Cl. 85—45)

This invention relates to screws and screw manufacture and more specifically, to recessed head screws such as those described in our co-pending application, Serial No. 287,772, filed under date of August 1, 1939; and this application is a continuation in part of our said co-pending application.

An object of this invention is to provide a screw with a recess which will most efficiently cooperate with a specially constructed driver to afford a stronger grip for the driver when engaged in turning the screw.

Another object of this invention is to provide such a recess which will offer not only a maximum grip but also a minimum tendency for the driver or bit to slip from engagement with the recess and become unseated and thereby ream or mar the recess and screw head.

A further object is to provide a screw with a recess of such shape and formation that the recess may be produced by a simple punching operation without danger of any distortion occurring in the head.

These and other objects we attain in a manner which will be briefly explained with reference to the accompanying drawings in which.

Figure 1:
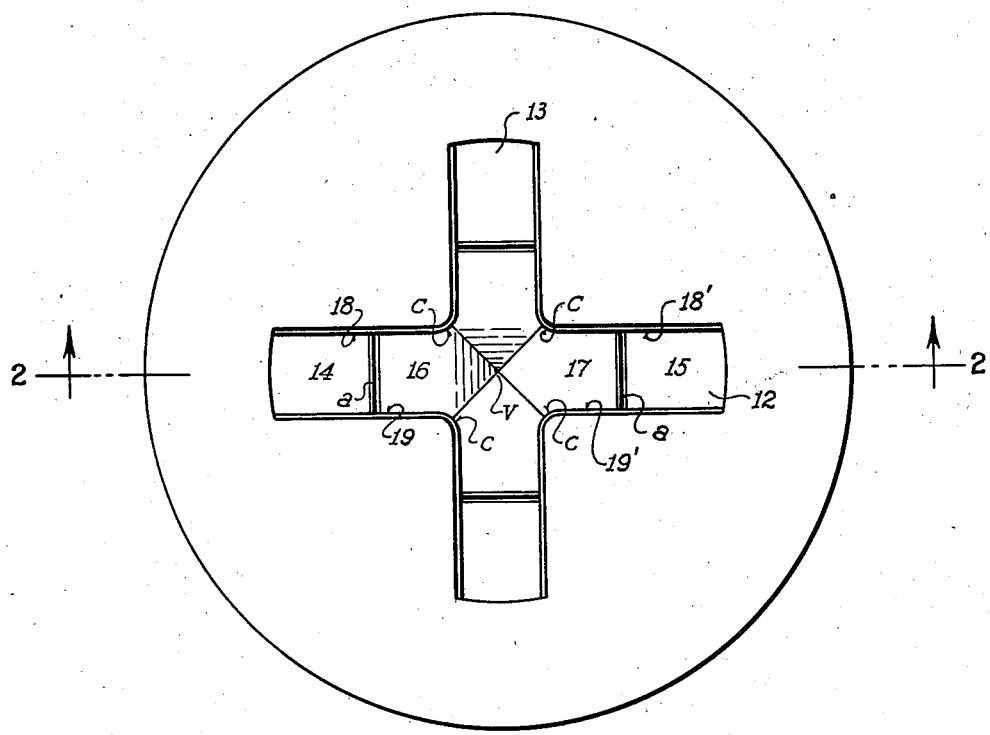
Figure 1 is a plan view of a screw head showing a recess formed in accordance with the principles of our invention, the screw head being drawn much larger than the actual size of the screw, for the purpose of clarity.

In the drawings our invention is shown as applied to a flat-headed screw, but it is to be understood that the invention is equally and broadly applicable to practically all of the conventional shapes of screw heads.

Figure 2:
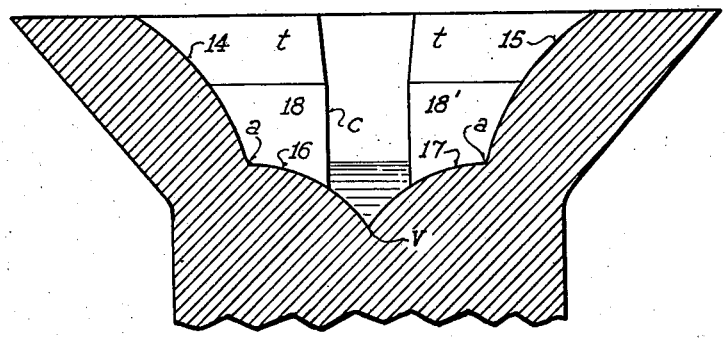
Figure 2 is a vertical sectional elevation taken on the line 2—2 of Figure 1.

Referring first to Figures 1 and 2, a cruciform recess is formed by a pair of identical slots 12 and 13 which intersect on the vertical axis of the screw. While the length of the slots will depend on the diameter of the screw head, we prefer to make the width of the slots uniform throughout a range of ordinary screw sizes so that our preferred driver can be employed without any change in the bit for the various sizes of screws within a reasonable range.

The cross-sectional configuration of the identical slots is of particular importance in our invention. The end walls of the slots, as shown in 14 and 15 in Figure 2, descend from the top face of the screw head in inwardly and downwardly curving planes. These inwardly and downwardly curved end walls 14 and 15 merge at $a$ with the bottom walls 16 and 17 respectively, which bottom walls are also inwardly and downwardly curved surfaces, as clearly shown in Figure 2. The bottom walls of all the slots converge at a common vertex $v$ which lies on the axis of the screw. The radius of curvature of the bottom surfaces or walls is preferably less than the radius of curvature of the end walls. This formation of the slots is similar to the formation of the main slot in the screw described in our co-pending application Serial No. 287,772 above mentioned, to which reference is made, and this convex contour of the end walls and bottom surfaces of the recess slots is also an important feature in this present invention and facilitates the forming of the screw head recess in a single punching operation with a minimum of distortion of the screw head.

An important feature of our screw recess resides in the fact that the side walls 18, 18' and 19, 19' in each of the slots are vertical and parallel throughout most of their extent, the uppermost portions only of these side walls being slightly tapered as indicated at $t$ in Figure 2. This slight taper at the upper portions of the side walls is designed to facilitate the easy entrance of a driving tool into the recess, and a slight taper at the top we have found to be sufficient for this purpose alone. We consider it preferable that this taper should extend not more than, for example, one-third of the total depth of the slots at the center of the screw. The depth of the taper is thus uniform along the slots, and consequently the lines of intersection of the opposite side walls with the top face of the screws are parallel respectively. The parallel edges at top and bottom of the opposite side walls of the slots are one of the features which distinguish our improved screw recess from somewhat similar recesses in screws now on the market.

The side walls of the intersecting radial slots meet at comparatively sharp shoulders $c$ (as shown in Figure 1), which are rounded by arcs of comparatively small radius. This is an additional improvement over conventional recessed head screws because greater area of the side walls of the slots, upon which walls the turning force of the driving tool is exerted, is made available as a bearing surface. The comparatively slight amount of taper in the entrance of the slots and the relatively large extent of straight vertical surface on each of the side walls also insures a large bearing area for the driver and, in addition, the tendency of the driver to ream the recess (a common fault in certain types of recessed screws now in common use) is almost entirely eliminated. The main cause of the reaming action is improper seating of the driving tool and the tendency of the driving tool to be forced out of the recess, and this is practically eliminated in our recess for the reasons explained. This is true also of our screw recess even when the driver does not actually contact the bottoms of the slots; thus the parallel vertical side walls of the slots and the substantial bearing area provided counteract the usual tendency of the driver to rise in the recess when high torque is developed.

Figure 3:
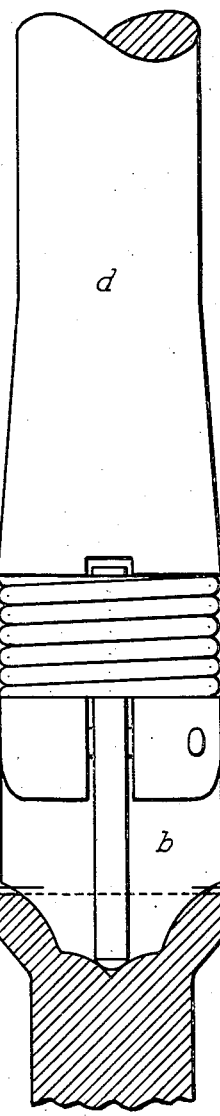
Figure 3 is a similar sectional view, on a smaller scale, showing a driving tool inserted in the recessed head of the screw.

While it is possible, when our screw recess is made in cruciform shape as shown in Figure 1, or when it is made with any numer of intersecting radial slots, two of which are diametrically opposite, to use an ordinary screw driver satisfactorily for driving our screw, in the same manner as shown with the screw described in our co-pending application, Serial No. 287,772, we prefer to employ a specially constructed driver, such as that shown in Figure 3, having a driving tool or bit b formed to engage all of the slots of the screw recess and thus obtain a greater gripping hold on the screw. When our screw is used with a driver formed to fit snugly in all the recess slots, and the screw is to be driven in places which are more or less difficult of access, that is, when it is not possible to exert pressure on the screw driver shank in exact alignment with the axis of the screw, we find it essential to employ a jointed driving tool and preferably such a screw driver as is described in our co-pending application, filed under date of August 1, 1939, entitled "Screw driver", Serial No. 287,-772, and reference is made to the driver described in this co-pending application. Such a driver permits the bit to be properly seated in the recess even though the shank may be rotated in angular relationship thereto. The driver shown in Figure 3, it will be observed, is similar to that described in our co-pending application, Serial No. 287,772 and has a shank d and a driving bit b which is connected to the shank by a suitable joint permitting shank and bit to move slightly out of alignment with each other.

Figure 4:
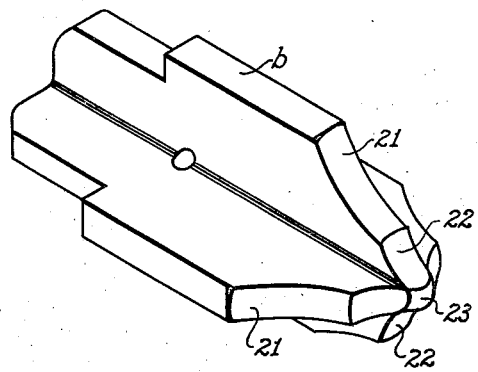
Figure 4 is an isometric projection of the detachable part of the special driving tool illustrated in Figure 3.

The bit used in this driver for our screw, when the recess as shaped as shown in Figure 1, is illustrated in Figure 4. This bit b is made from a section of a bar of metal milled so as to have suitable cruciform cross-section. The driving end of the bit is then machined in a single rotary machine operation to the configuration shown, such configuration being made to conform with the internal contour of the bottom and end walls of the slots of the recess. Thus the wings are made concave as at 21 and 22 to fit the end walls and bottom surfaces of the recess. The tip however is preferably rounded off to provide a ball point 23 as shown.

Figure 6:
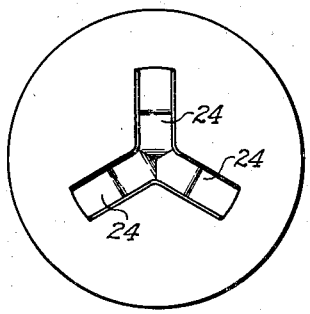
Figure 6 is a plan view of a modified form of a screw recess embodying the principles of our invention.

Figure 6 illustrates a modified form of recess comprising three radial slots, 24 of equal length symmetrically disposed in the screw head, which intersect on the axis of the screw, the slots being otherwise identical to the four radial slots of the recess in Figure 1. In driving a screw with this modified form of our recess, a bit with three identical wings, similar to those of the four wings of the bit of Figure 4 is employed. This modified form of our screw cannot be driven with an ordinary screw driver and is suitable for use in places where screws are preferably employed which can be removed only by a specially made tool. The bottoms and side walls of the slots in this modified form of our screws are the same as those of the screw already described.

Similarly it would be possible to make our screw with five or six identical symmetrically-spaced intersecting radial slots, and, due to the contour of the bottom and end walls of the intersecting slots, it would be possible to punch the recess in each case with a single punching operation with a minimum of distortion of the screw head. For most practical purposes however the recess of the form shown in Figure 1 we believe to be the most practical.

Figure 5:
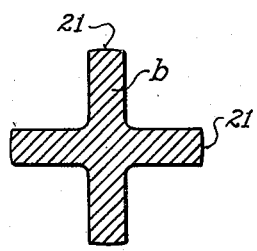
Figure 5 is a sectional plan of that part of the tool taken on the line 5—5 of Figure 3, with the screw omitted.

The punch employed for forming the cruciform recess of Figure 1 resembles the driver bit illustrated in Figures 3, 4, and 5, except that the tip of the punch is made in the form of a curved-wall pyramid with a sharp point which, under pressure, enters the metal of a screw and penetrates to the vertex v of the recess. The inwardly-curved or concave surfaces of the wings of the punch, corresponding to the end walls 14 and 15, and to the bottom surfaces 16 and 17 of the slots of the recess, concentrate the force of the punch toward the vertex v or axis of the screw and reduce the radial thrust which would otherwise tend to enlarge and distort the screw head.

We claim:

1. A screw having a head formed with a driving recess comprising, a plurality of similar, symmetrically-spaced, radial slots, said slots intersecting on the screw axis, said slots terminating short of the periphery of said screw head, the end wall of each slot sloping downwardly and inwardly, the bottom of each slot constituting a convex surface extending from the bottom of the end wall to the screw axis, the convex bottoms of said slots converging on the screw axis and said slots adapted to be formed by a pointed punch having radial wings corresponding to said slots, the side walls of each slot being vertical for a substantial distance from the bottom to receive and engage the surfaces of the wings of a driving bit of a generally corresponding shape without exerting any tendency to push said bit out of said recess.

2. In a screw head a recess comprising, a plurality of similar, symmetrically-spaced, radial slots, said slots intersecting on the screw axis, said slots terminating short of the periphery of said screw head, the end wall of each slot sloping downwardly and inwardly, the bottom of each slot constituting a convex surface extending from the bottom of the end wall to the screw axis, the convex bottoms of said slots converging on the screw axis and said slots adapted to be formed by a pointed punch having radial wings corresponding to said slots, the intersections of the bottom and side walls of each slot being parallel and the intersections of the side walls of each slot with the top face of the screw being parallel, the side walls of each slot being vertical and parallel for a substantial distance from the bottom to receive and engage the parallel surfaces of the wings of a driving bit of a generally corresponding shape without exerting any tendency to push said bit out of said recess.

3. In a screw head a recess comprising, a plurality of similar, symmetrically-spaced, radial slots, said slots intersecting on the screw axis, said slots terminating short of the periphery of said screw head, the end wall of each slot formed into a downwardly extending convex surface, the bottom of each slot constituting a convex surface extending from the bottom of the end wall to the screw axis, the convex bottoms of said slots converging on the screw axis and said slots adapted to be formed by a pointed punch having radial wings corresponding to said slots, the intersections of the bottom and side walls of each slot being parallel and the intersections of the side walls of each slot with the top face of the screw being parallel, the side walls of each slot being vertical and parallel for a substantial distance from the bottom to receive and engage the parallel surfaces of the wings of a driving bit of a generally corresponding shape without exerting any tendency to push said bit out of said recess.

4. The combination described in claim 3 with said side walls tapered outwardly slightly near the top to facilitate the insertion of the driver into said recess.

5. The combination described in claim 3 with the radius of curvature of the convex bottoms of said slots being less than the radius of curvature of the convex end walls.

6. In a screw head a recess including, a pair of similar slots intersecting each other at right angles, said slots intersecting on the screw axis, said slots terminating short of the periphery of said screw head, the end walls of each slot formed into downwardly extending convex surfaces, the bottom of each slot constituting a pair of similar convex surfaces converging on the screw axis and extending to the bottoms of the end walls respectively, the intersections of the bottom and side walls of each slot being parallel and the intersections of the side walls of each slot with the top face of the screw being parallel, the side walls of each slot being vertical and parallel for a substantial distance from the bottom to receive and engage the parallel surfaces of the wings of a driving bit of a generally corresponding shape without exerting any tendency to push said bit out of said recess.

7. The combination described in claim 6 with said side walls tapered outwardly slightly at the top for a distance equal to approximately one-third of the maximum depth of said slots to facilitate the insertion of the driver into said recess.

MAXWELL A. WEST.
GEORGE E. WEST.